(12) United States Patent  (10) Patent No.: US 8,776,235 B2
Coronado et al.  (45) Date of Patent: Jul. 8, 2014

(54) STORAGE DEVICE WITH INTERNALIZED ANTI-VIRUS PROTECTION

(75) Inventors: Juan A. Coronado, Tucson, AZ (US); Sara M. Coronado, Tucson, AZ (US); Christina A. Lara, Tucson, AZ (US); Lisa R. Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 13/347,408

(22) Filed: Jan. 10, 2012

(65) Prior Publication Data

US 2013/0179972 A1  Jul. 11, 2013

(51) Int. Cl.
*G06F 11/00* (2006.01)
*G06F 15/173* (2006.01)

(52) U.S. Cl.
USPC ............................................. 726/24; 709/224

(58) Field of Classification Search
USPC ........................ 726/22–24; 713/188; 709/219, 709/223–224, 227; 717/171–173
See application file for complete search history.

(56) References Cited

U.S. PATENT DOCUMENTS

| | | | | |
|---|---|---|---|---|
| 6,735,700 | B1* | 5/2004 | Flint et al. ........................ | 726/24 |
| 6,748,534 | B1 | 6/2004 | Gryaznov et al. | |
| 7,243,373 | B2 | 7/2007 | Muttik et al. | |
| 7,624,444 | B2 | 11/2009 | Gupta et al. | |
| 8,176,526 | B1* | 5/2012 | Yang et al. ........................ | 726/1 |
| 2002/0016959 | A1* | 2/2002 | Barton et al. ................. | 717/178 |
| 2002/0078142 | A1* | 6/2002 | Moore et al. ................. | 709/203 |
| 2002/0100036 | A1* | 7/2002 | Moshir et al. ................. | 717/173 |
| 2002/0116639 | A1* | 8/2002 | Chefalas et al. .............. | 713/201 |
| 2002/0138760 | A1* | 9/2002 | Naitoh .......................... | 713/201 |
| 2002/0147915 | A1* | 10/2002 | Chefalas et al. .............. | 713/188 |
| 2003/0023864 | A1 | 1/2003 | Muttik et al. | |
| 2004/0078599 | A1* | 4/2004 | Nahum ......................... | 713/201 |
| 2005/0283640 | A1* | 12/2005 | Cheston et al. ................. | 714/4 |
| 2006/0185015 | A1* | 8/2006 | Cheston et al. ................. | 726/24 |
| 2007/0180226 | A1* | 8/2007 | Schory et al. ................. | 713/153 |
| 2008/0046552 | A1 | 2/2008 | Watson et al. | |
| 2008/0196104 | A1* | 8/2008 | Tuvell et al. .................... | 726/24 |
| 2009/0019137 | A1* | 1/2009 | Mishra et al. ................. | 709/220 |
| 2009/0019544 | A1* | 1/2009 | Suffern et al. ................. | 726/22 |
| 2009/0089880 | A1* | 4/2009 | Kobayashi et al. ............ | 726/24 |
| 2009/0119681 | A1* | 5/2009 | Bhogal et al. ................. | 719/318 |
| 2010/0077481 | A1* | 3/2010 | Polyakov et al. .............. | 726/24 |
| 2010/0262584 | A1* | 10/2010 | Turbin et al. .................. | 707/674 |
| 2011/0016529 | A1* | 1/2011 | Kakie ............................ | 726/24 |
| 2011/0173490 | A1 | 7/2011 | Narayanaswamy et al. | |

(Continued)

OTHER PUBLICATIONS

U.S. Appl. No. 13/592,057 Office Action, dated Jun. 26, 2013.

(Continued)

*Primary Examiner* — Darren B Schwartz
(74) *Attorney, Agent, or Firm* — Kunzler Law Group

(57) ABSTRACT

An approach to handling connection errors between an external antivirus server and a storage device is disclosed. The storage device is equipped with an internal antivirus server. Antivirus metadata that describes the antivirus scan is stored in an antivirus metadata repository on the storage device. The connection between the external antivirus server and the storage device is monitored. The external antivirus server executes the antivirus scan on the storage device. If the connection fails, control of the antivirus scan is passed from the external antivirus server to the internal antivirus server. The internal antivirus server determines where to begin based on the antivirus metadata. When the connection is restored, control is passed back to the external antivirus server.

19 Claims, 5 Drawing Sheets

(56) References Cited

U.S. PATENT DOCUMENTS

| | | |
|---|---|---|
| 2011/0197279 A1* | 8/2011 | Ueoka .............................. 726/24 |
| 2011/0302655 A1 | 12/2011 | Tikkanen et al. |
| 2012/0102569 A1* | 4/2012 | Turbin ............................ 726/24 |

OTHER PUBLICATIONS

U.S. Appl. No. 13/592,057 Final Office Action, dated Dec. 2, 2013.

* cited by examiner

STORAGE DEVICE WITH INTERNALIZED ANTI-VIRUS PROTECTION

FIELD

The subject matter disclosed herein relates to storage devices with internalized anti-virus protection.

BACKGROUND

Some sort of antivirus protection is a must in most systems in order to ensure data integrity and data protection. Antivirus protection is generally a part of any storage system.

In some storage systems, an antivirus program is run on a server of machine that is external to the individual storage devices. For example, a dedicated antivirus server may run on a machine that is separate from a network attached storage (NAS) storage device. Given the large amounts of data that can be stored on certain types of storage devices, scanning a storage device can take considerable time. In addition, the length of time it takes for an antivirus scan to complete may vary based on considerations such as the available bandwidth between the external antivirus server and the storage device.

Typically, an antivirus program locks files as part of the scanning process. Thus, delays in executing the antivirus scan can also result in reduced availability of files. These problems, and others, can be exacerbated when the external antivirus server loses contact with the storage device. The physical connection between the external antivirus server may be disrupted. The external antivirus server may be in maintenance mode, or having its software updated. The external antivirus server itself may crash. In certain instances, the antivirus program running on the antivirus server may be updated, but be unstable and crash. Many possible circumstances, both foreseen and unforeseen, may arise that cause the external antivirus server to lose communication with the storage device that is being scanned. As a result, file access may be compromised, as may be the integrity and overall safety of the system.

BRIEF SUMMARY

An approach to maintaining antivirus services is disclosed. The summary that follows is for convenience, and is not a limitation on the claims.

The invention may be realized as a computer program product stored on a computer readable storage medium. The computer program product may comprise various instructions, including instructions for monitoring a connection between an external antivirus server and a storage device. The external antivirus server may be configured to execute an antivirus scan on the storage device. The product may also include instructions for recording antivirus metadata that describes the antivirus scan in an antivirus metadata repository stored on the storage device. There may also be instructions for passing control of the antivirus scan to an internal antivirus server that runs on the storage device in response to a failure in the connection, and for returning control of the antivirus scan to the external antivirus server when the connection is restored.

In certain embodiments, passing control of the antivirus scan to the internal antivirus server involves determining a progress marker of the antivirus scan from the antivirus metadata, and continuing the antivirus scan from a point determined from the progress marker. Monitoring the connection between the external antivirus server and the storage device may involve the external antivirus server sending one or more heartbeats to the storage device.

The external antivirus server may execute a test version of the antivirus software, while the internal antivirus server runs a production version of the antivirus software. The storage device may be a network attached storage (NAS) device.

In certain embodiments, the invention may be realized as a system. The system may include the external antivirus server, the internal antivirus server, and an antivirus central control module that executes on the storage device. The antivirus central control module may be responsible for passing control to the internal antivirus server if the connection fails, and for returning control of the antivirus scan to the external antivirus server when the connection is restored. The system may include multiple storage devices, each with an internal antivirus server and antivirus central control module.

The present invention may be realized in a variety of forms. The present invention may be realized as a computer program product, a system, a method, or other form. References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
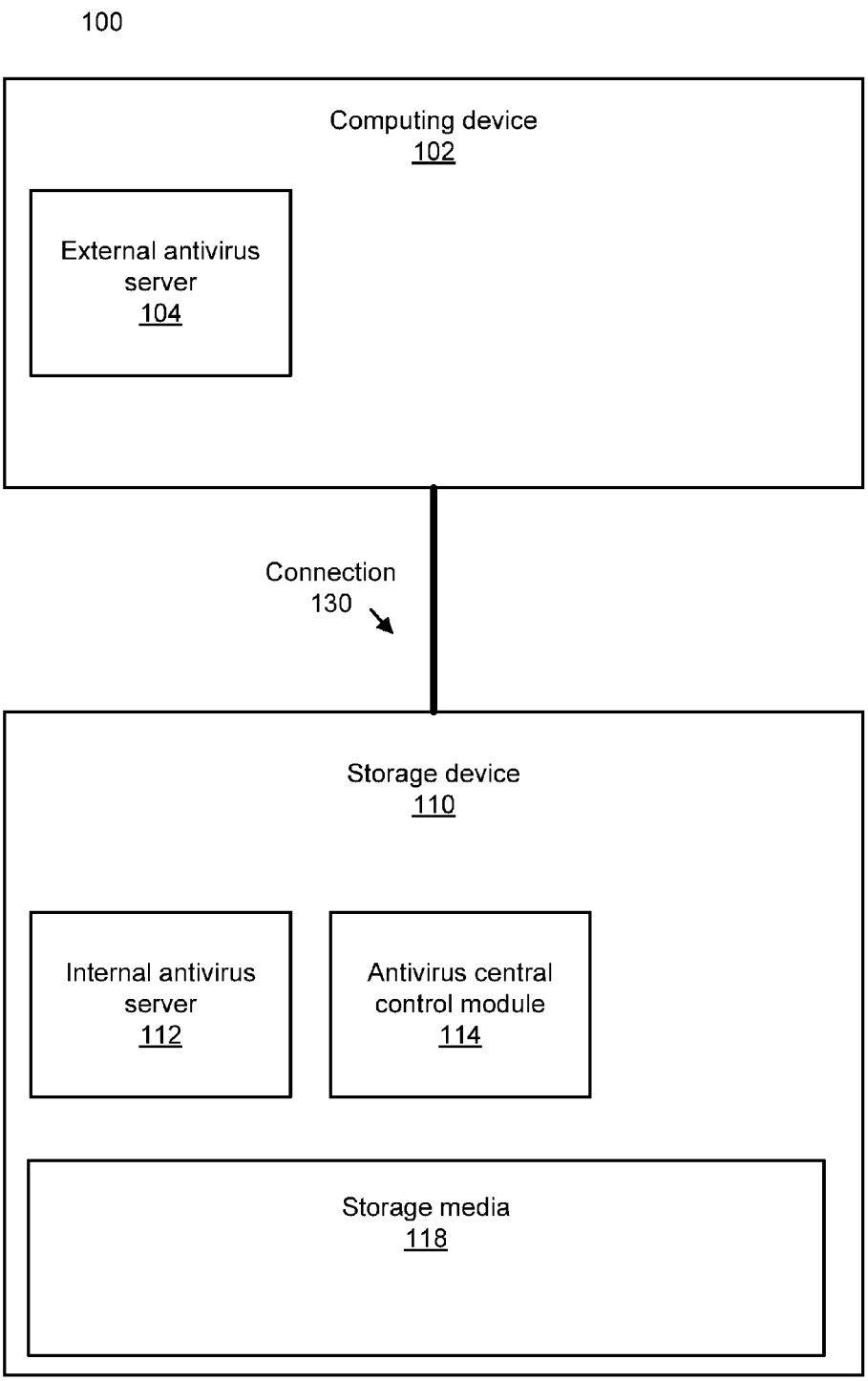
FIG. 1 is an illustrative block diagram showing one embodiment of a system comprising a computing device, a connection, and a storage device including an antivirus central control module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be non-transitory.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 including a computing device 102 connected to a storage device 110 by a connection 130. While FIG. 1 shows only one computing device 102 and one storage device 110, the system 100 may be more complex and include other components as well. For example, the system 100 may include one or more client devices, separate from the computing device 102 and the storage device 110 that store data on the storage device 110. The system 100 may be, for example, a storage system using network attached storage (NAS), a storage area network (SAN), or other.

The computing device 102 is a physical device with a processor and memory for executing instructions. The computing device 102 may be separate from the client device. In other embodiments, the computing device 102 is the client device, and also executes the external antivirus server 104.

The storage device 110 is a physical device comprising computer readable storage media 118 and capable of executing programs that affect data stored on the storage media 118. The storage device 110 may include a general processor and memory for executing programs. The storage device 110 may be configured to execute such programs in firmware on the storage device 110. The storage media 118 may be hard disks, tape, solid state storage, or other suitable nonvolatile storage technology capable of storing data. The storage device 110 may include more components than those shown in FIG. 1. In one embodiment, the storage device 110 is a network storage device. The storage device 110 may be a NAS storage device such as IBM's SONAS storage system. The storage device 110 may be a hard disk drive that connects to a computer. Other types of storage device 110 may also be used.

The computing device 102 is connected to the storage device 110 by a connection 130. The term "connection," as used herein, refers to a communications connection that allows data to be transferred between the connected devices. In one embodiment, the connection 130 is a network connection. A network connection is a connection that connects two devices in a network. The network connection may use any of a variety of communications protocols including, but not limited to, Ethernet, Infiniband, and Fibre Channel. In other embodiments, the connection 130 is a bus connection. A bus connection is a connection that connects two devices using bus technologies. The bus connection may use communications protocols such as Peripheral Component Interconnect (PCI) Express, Universal Serial Bus (USB), and other protocols.

The computing device 102 includes an external antivirus server 104. As used herein, the term "external antivirus server" refers to a server that is implemented on a computing device that is separate from, and external to, the storage device 110 and that provides antivirus services to the storage device 110. The term "external antivirus server" may refer to a computer program running to service the requests of other programs. The external antivirus server 104 runs antivirus software that may detect and remove malware from the storage device 110. The external antivirus server 104 may, for example, search for worms, trojan horses, spyware, and other forms of malicious code that are referred to generally as a computer virus. The external antivirus server 104 may scan the files and other data structures that are stored in the storage media 118. The process of analyzing the data on the storage device 110 and determining whether any of that data is infected is referred to as an antivirus scan. The antivirus scan may be focused on a single file. For example, the external antivirus server 104 may execute an antivirus scan on any file in the storage device 110 that is requested by a client before the file is sent to the client. The antivirus scan may be initiated by a user, or be automatically initiated on a set schedule. The antivirus scan may be executed on a number of files, and may move through the files and data structures in the storage media 118 in a logical fashion that ensures that all relevant files and data structures are analyzed to determine whether they are infected with any sort of computer virus. The external antivirus server 104 may use traditional approaches to detecting and handling viruses.

As mentioned above, in certain circumstances, the external antivirus server 104 may lose communication with the storage device 110. For example, a network problem may disrupt the connection 130. A hardware or software failure on the computing device 102 may bring down the external antivirus server 104. Many circumstances may occur which cause the external antivirus server 104 to lose communication with the storage device 110.

The storage device 110 may be equipped with an antivirus central control module 114. The antivirus central control module 114 may be implemented in software, firmware, or some combination on the storage device 110. The antivirus central control module 114 allows control of the antivirus scan to be passed between the external antivirus server 104 and an internal antivirus server 112 based on the status of the connection 130.

As used herein, the term "internal antivirus server" refers to a server that is implemented internally on the storage device 110 and that provides antivirus services to the storage device 110. The term "internal antivirus server" may refer to a computer program running to service the requests of other programs. For example, the internal antivirus server 112 may be implemented on an IBM SONAS storage device. Because the internal antivirus server 112 is implemented internally, failures or problems with the connection 130 do not affect the ability of the internal antivirus server 112 to execute antivirus scans on the storage device 110.

The antivirus central control module 114 refers to a component that is implemented on the storage device 110 and that manages control of the antivirus scan. Under normal operation, the external antivirus server 104 executes the antivirus scan on the storage device 110. The antivirus central control module 114 may be configured to monitor the connection 130 between the external antivirus server 104 and the storage device 110, and to record antivirus metadata that describes the antivirus scan in an antivirus metadata repository stored on the storage device 110. The antivirus central control module 114 may also be configured to pass control of the antivirus scan to the internal antivirus server 112 if there is a failure in the connection 130. The antivirus central control module 114 may continue to monitor the status of the connection 130, and may return control of the antivirus scan to the external antivirus server in response to restoration of the connection 130.

Antivirus metadata refers to metadata that describes the progress of the antivirus scan. The antivirus metadata may include, in certain embodiments, information on who performed the antivirus scan, when the antivirus scan was started, the progress of the antivirus scan, or other data. The antivirus metadata may, for example, describe progress of the scan on a file level of granularity; thus, if the connection 130 were lost halfway through the antivirus scan of a file, the antivirus scan would be restarted by the internal antivirus server 112 at the beginning of that file. In other embodiments, the antivirus metadata describes the progress of the scan at a sub-file granularity; for example, the antivirus metadata may describe how far into the particular file the antivirus scan has progressed such that, if the connection 130 is lost, the antivirus scan can be resumed at a point that is midway through the file. Other varieties of antivirus metadata may also be used.

Having the external antivirus server 104 work in cooperation with the internal antivirus server 112 and the antivirus central control module 114 can help ensure higher availability of the antivirus scan and improved operations of the system 100.

Figure 2:
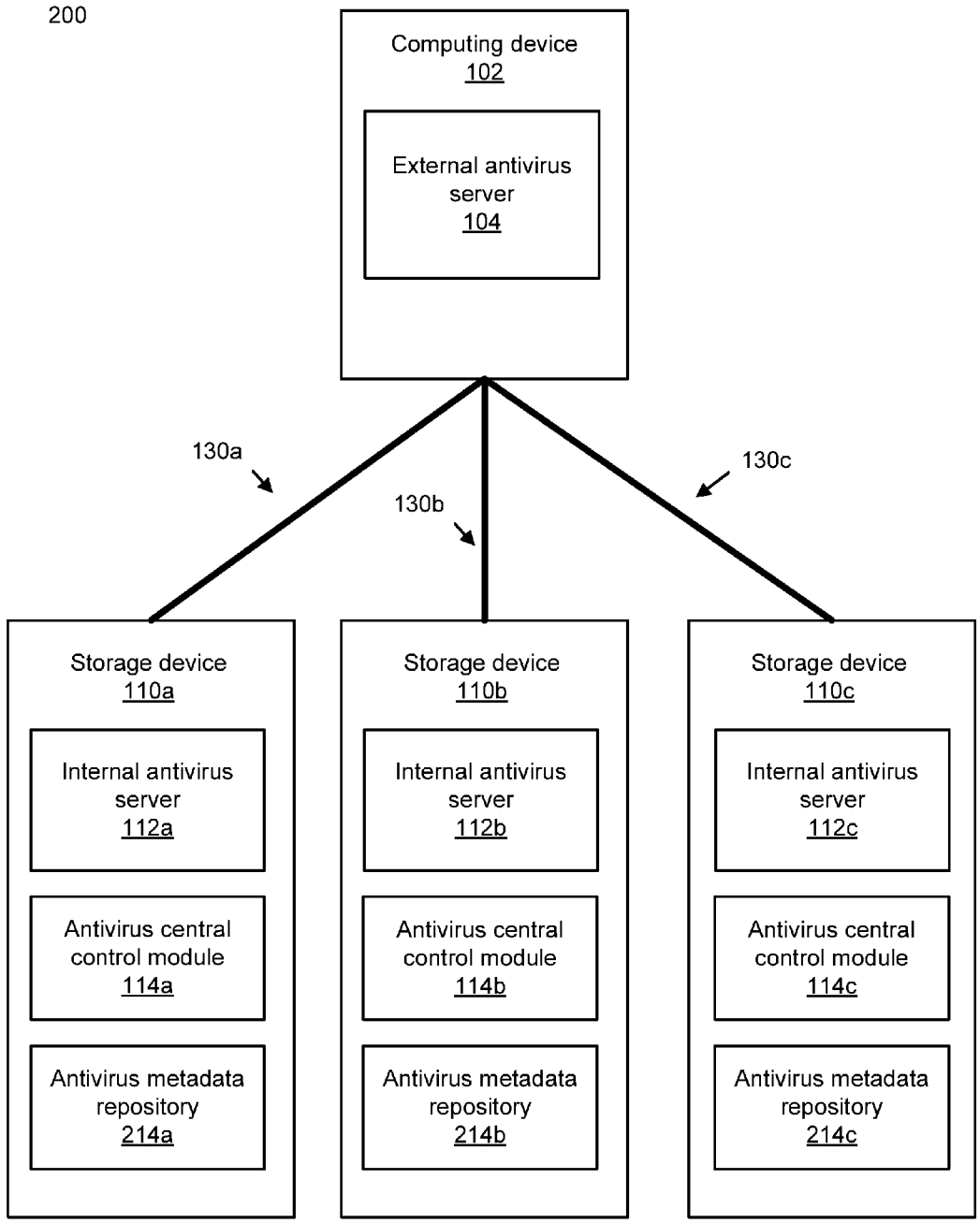
FIG. 2 is an illustrative block diagram showing one embodiment of a system including a computing device and multiple storage devices.

FIG. 2 shows an embodiment of a system 200 comprising a computing device 102 implementing an external antivirus server 104 and storage devices 110a-c. In FIG. 2, the external antivirus server 104 executes antivirus scans on each of the storage devices 110a-c. The external antivirus server 104 is connected to the storage devices 110a-c by respective connections 130a-c.

In FIG. 2, each storage device 110a-c has a respective internal antivirus server 112a-c that can each execute an antivirus scan on its respective storage device 110a-c. Each storage device 110a-c in FIG. 2 similarly has an antivirus central control module 114 that monitors the respective connections 130a-c. Antivirus metadata that describes the antivirus scan on the respective storage devices 110a-c is stored in an antivirus metadata repository 214a-c. Thus, the antivirus central control module 114a may store antivirus metadata describing the antivirus scan on the storage device 110a in the antivirus metadata repository 214a, while the antivirus central control module 114b may store antivirus metadata describing the antivirus scan on the storage device 110b in the antivirus metadata repository 214b.

As an example, the external antivirus server 104 may be configured to execute an antivirus scan on the storage device 110a (which may be referred to as a first storage device) and on the storage devices 110b-c (which may be referred to as second storage devices). The external antivirus server 104 may send antivirus metadata describing the progress of the antivirus scan on the storage device 110a to the antivirus central control module 114a. The antivirus central control module 114a may write the antivirus metadata to the antivirus metadata repository 214a. The external antivirus server may similarly send antivirus metadata describing the antivirus scan on storage device 110c to the antivirus central control module 114c.

The antivirus central control module 114a may monitor the connection 130a and determine that the connection 130a has failed. In response, the antivirus central control module 114a may pass control of the antivirus scan to the internal antivirus server 112a. Passing control of the antivirus scan may involve determining a progress marker of the antivirus scan from the antivirus metadata stored in the antivirus metadata repository 214a, and the internal antivirus server 112a continuing the antivirus scan from a point determined from the progress marker.

The internal antivirus server 112a may thus take control of the antivirus scan. The internal antivirus server 112a may also provide the antivirus central control module 114a with antivirus metadata, which is written in the antivirus metadata repository 214a. The antivirus central control module 114a may continue to monitor the connection 130a while the internal antivirus server 112*a* executes the antivirus scan. If the antivirus central control module 114*a* determines that the connection 130*a* has been restored, the antivirus central control module 114*a* may return control of the antivirus scan to the external antivirus server 104. Returning control may involve causing the internal antivirus server 112*a* to stop the antivirus scan, sending antivirus metadata to the external antivirus server 104, and instructing the external antivirus server 104 to resume the antivirus scan on the storage device 110*a*. A similar process may take place on the respective storage devices 110*b* and 110*c*.

Figure 3:
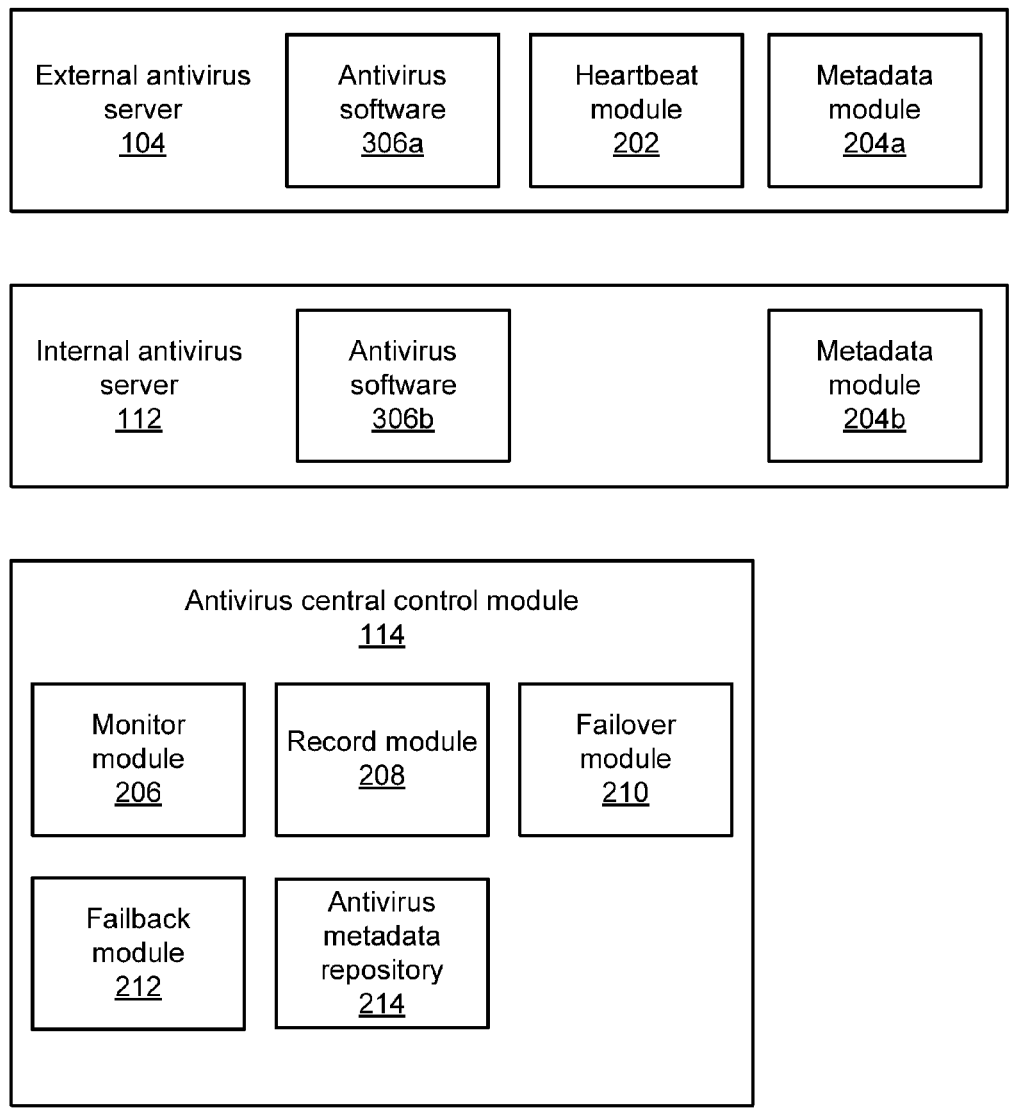
FIG. 3 is an illustrative block diagram showing one embodiment of an external antivirus server, an internal antivirus server, and an antivirus central control module.

FIG. 3 shows one embodiment of an external antivirus server 104, an internal antivirus server 112, and an antivirus central control module 114. In certain embodiments, the antivirus central control module 114 includes a monitor module 206, a record module 208, a failover module 210, a failback module 212, and an antivirus metadata repository 214.

The monitor module 206 may be configured to monitor the connection 130 between the external antivirus server 104 and the storage device 110. In certain embodiments, the monitor module 206 monitoring the connection 130 may involve the external antivirus server 104 sending heartbeats to the storage device 110. The external antivirus server 104 may comprise a heartbeat module 202 to generate the heartbeats and send them to the monitor module 206.

The monitor module 206 may expect to receive heartbeats at regular intervals. The monitor module 206 may be configured with a timeout value. If the period of time since the last heartbeat was received exceeds the timeout value, the monitor module 206 may determine that the connection 130 has failed. In certain embodiments, the timeout value is sufficiently large to allow for multiple heartbeats to be missed before the monitor module 206 determines that the connection 130 has failed. Such an arrangement may help reduce the occurrence of false reports of a failure in the connection 130. The timeout value may be user configurable.

The record module 208 may be configured to record antivirus metadata that describes the antivirus scan in the antivirus metadata repository 214. While the connection 130 is functional, the antivirus metadata may be generated by the external antivirus server 104. In certain embodiments, the external antivirus server 104 includes a metadata module 204*a* that generates antivirus metadata for the antivirus scan as performed by the external antivirus server 104. The metadata module 204*a* may send the antivirus metadata to the record module 208, which records the antivirus metadata in the antivirus metadata repository 214. In other embodiments, the record module 208 may monitor the actions taken by the external antivirus server 104 on the storage device 110 and derive the antivirus metadata. The record module 208 may combine the above approaches to derive antivirus metadata.

The failover module 210 may be configured to pass control of the antivirus scan to the internal antivirus server 112 in response to a failure in the connection 130. For example, the monitor module 206 may determine that no heartbeat has been received for a period of time that exceeds a timeout value, and notify the failover module 210 that the connection 130 has failed.

The failover module 210 may retrieve antivirus metadata form the antivirus metadata repository 214 and determine a progress marker of the antivirus scan. The progress marker indicates the last verifiable point to which the antivirus scan had run. The failover module 210 may then pass control of the antivirus scan to the internal antivirus server 112. Passing control may involve causing the internal antivirus server 112 to begin executing the antivirus scan on the storage device 110 on which the internal antivirus server 112 is implemented. The antivirus scan may be started at the last verifiable point, as determined from the progress marker.

Once the internal antivirus server 112 takes control of the antivirus scan, a metadata module 204*b* may begin generating antivirus metadata that describes the antivirus scan as executed by the internal antivirus server 112. This antivirus metadata may be written by the record module 208 to the antivirus metadata repository 214. As above, the metadata module 204*b* may send the antivirus metadata to the record module 208, the record module 208 may create the antivirus metadata from the activities of the internal antivirus server 112, or some combination thereof. The metadata module 204*b* need not be identical to the metadata module 204*a*, and need not generate the antivirus metadata in the same way.

The monitor module 206 may continue to monitor the status of the connection 130 while the internal antivirus server 112 executes the antivirus scan. The monitor module 206 may be configured to determine whether the connection 130 is restored. In one embodiment, the monitor module 206 continues to listen for heartbeats while the internal antivirus server 112 is executing the antivirus scan. The monitor module 206 may require the external antivirus server 104 to send a predetermined number of heartbeats before determining that the connection 130 has been restored. The monitor module 206 may require that the external antivirus server 104 continue to send heartbeats for a predetermined period of time before determining that the connection 130 has been restored. The monitor module 206 may take additional actions to determine that the connection 130 is not only restored, but that it also appears to be stable.

The monitor module 206 may invoke the failback module 212 after determining that the connection 130 is restored. The failback module 212 may be configured to return control of the antivirus scan to the external antivirus server 104 in response to the restoration of the connection 130. In certain embodiments, returning control involves stopping the internal antivirus server 112, determining a progress marker of the antivirus scan from the antivirus metadata, initiating the external antivirus server 104, and causing the external antivirus server 104 to continue the antivirus scan from a point determined by from the progress marker.

The antivirus metadata repository 214 may be any suitable data structure for saving data. The antivirus metadata repository 214 may be a database table, a flat file, or other appropriate data structure. The antivirus metadata repository 214 may be implemented as part of, or separate but accessible to, the antivirus central control module 114.

The external antivirus server 104 and the internal antivirus server 112 both comprise antivirus software 306*a-b*. The antivirus software 306*a-b* comprises the instructions that allow the executing server to detect and manage viruses. In certain embodiments, the external antivirus server 104 and the internal antivirus server 112 execute the same version of the antivirus software 306*a-b*. In other embodiments, the external antivirus server 104 may execute a first version of the antivirus software 306 *a-b*, and the internal antivirus server 112 executes a second version of the antivirus software 306*a-b*. For example, the antivirus software 306*a* may be a test version of antivirus software 306*a-b*, while the antivirus software 306*b* is the production version of the antivirus software 306*a-b*. As a result, the external antivirus server 104 and internal antivirus server 112 may cooperate to reduce the possible negative impact when introducing new antivirus software 306*a-b* into the system 200.

Figure 4:
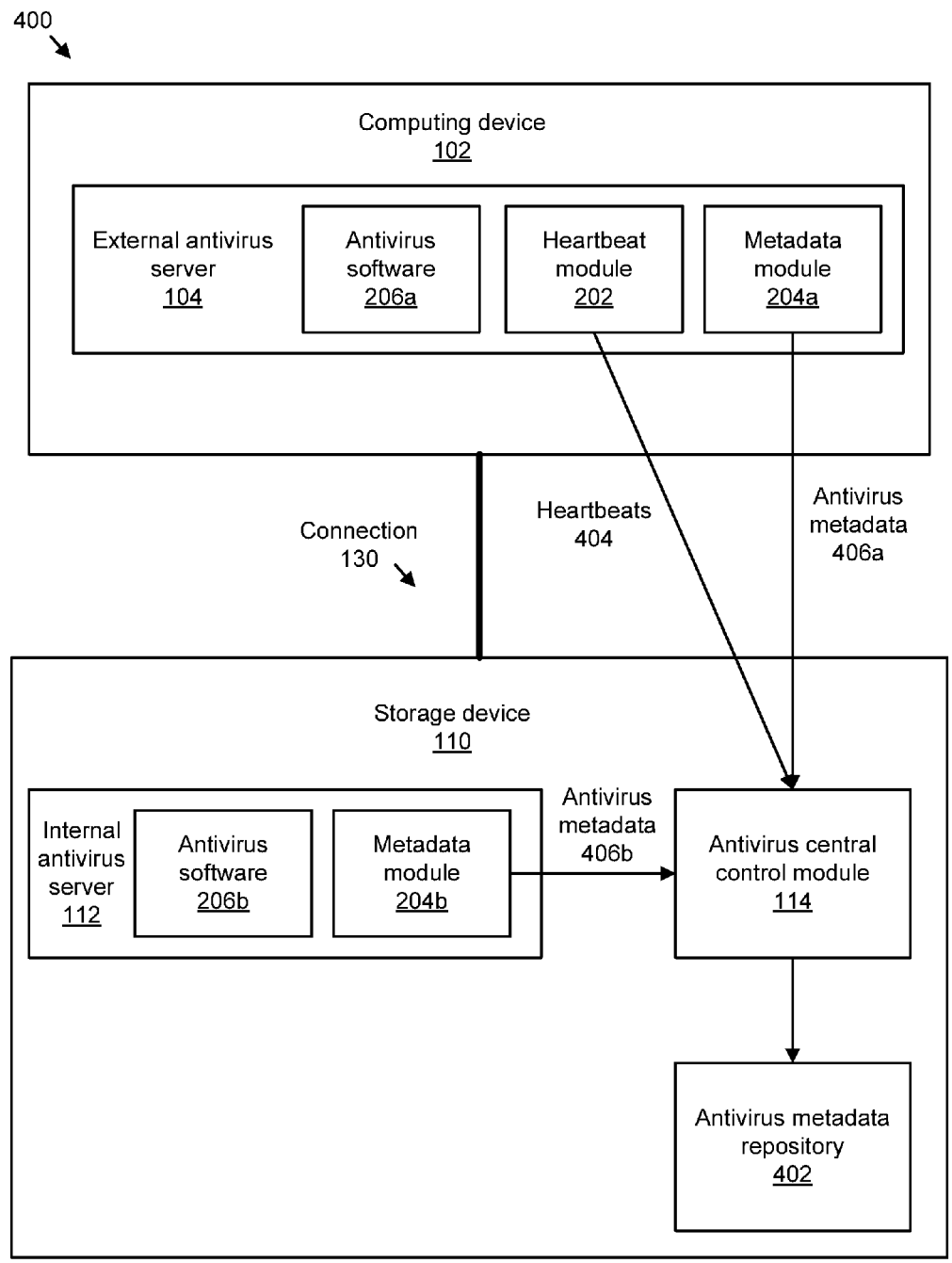
FIG. 4 is an illustrative block diagram showing one embodiment of a system and flow of information with the system.

FIG. 4 shows one embodiment of a system 400 comprising a computing device 102 and a storage device 110, and how information may be shared in such a system. The depiction shown in FIG. 4 is simply one example of possible information flow.

The computing device 102 in FIG. 4 includes an external antivirus server 104 running antivirus software 306a, a heartbeat module 202, and a metadata module 204a. The storage device 110 includes an internal antivirus server 112 running antivirus software 306b, and metadata module 204b. The storage device 110 also includes an antivirus central control module 114 and an antivirus metadata repository 402.

While the connection 130 is functioning, the heartbeat module 202 may be configured to send heartbeats 404 to the antivirus central control module 114. The antivirus central control module 114 may use the heartbeats 404 to determine the status of the connection 130. The antivirus central control module 114 may also receive antivirus metadata 406a while the connection 130 is functioning. As mentioned above, the connection 130 may be lost due to hardware failure, software failure on the external antivirus server 104, maintenance on the external antivirus server 104, or other possible causes.

The antivirus central control module 114 may determine that there is a failure in the connection 130 if the antivirus central control module 114 fails to receive one or more heartbeats 404 within a predetermined timeout period. The antivirus central control module 114 may pass control to the internal antivirus server 112 in response. The internal antivirus server 112 may then provide antivirus metadata 406b to the antivirus central control module 114 while the internal antivirus server 112 has control of the antivirus scan.

The antivirus central control module 114 may continue to monitor the connection 130, and determine that the connection 130 is restored if it receives one or more heartbeats 404 after the failure in the connection 130. When the connection 130 is determined to be restored, the antivirus central control module 114 may return control of the antivirus scan to the external antivirus server 104. The internal antivirus server 112 may then stop sending the antivirus metadata 406b, and the external antivirus server 104 may resume sending the antivirus metadata 406a.

Figure 5:
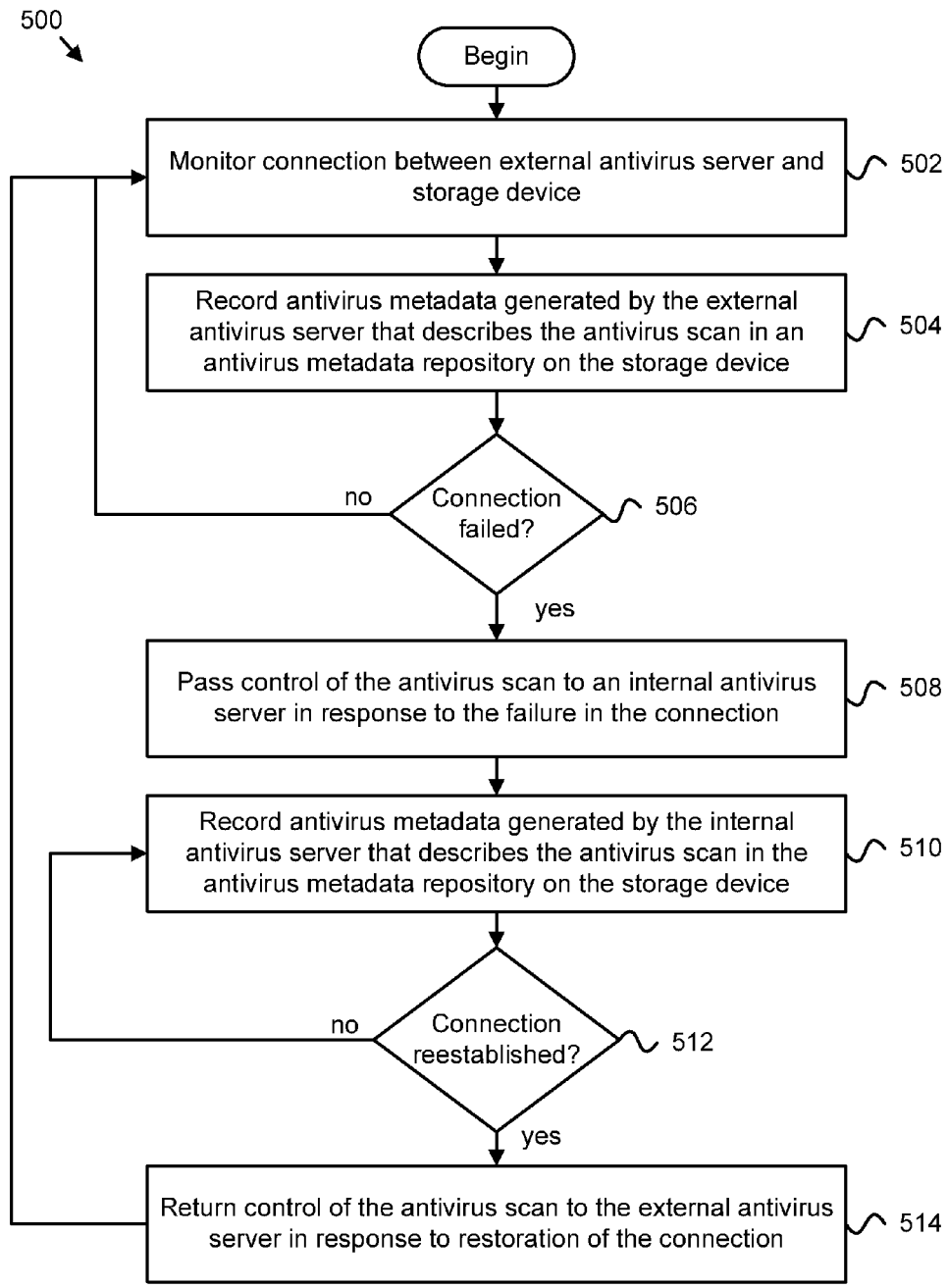
FIG. 5 is an illustrative flow chart diagram illustrating one embodiment of a method for using an internal antivirus server in response to failures in a connection to an external antivirus server.

FIG. 5 shows one embodiment of a method 500 for providing more robust antivirus protection using an internal antivirus server 112 that works in cooperation with an external antivirus server 104. The method begins with monitoring 502 the connection 130 between the external antivirus server 104 and the storage device 110. The method may also involve recording 504 antivirus metadata 406a generated by the external antivirus server 104 that describes the antivirus scan in an antivirus metadata repository 402 on the storage device 110.

The method may also involve monitoring 506 the connection 130 in order to determine whether the connection 130 has failed. If the connection 130 has not failed, the connection 130 may continue to be monitored, and antivirus metadata 406a generated by the external antivirus server 104 recorded. If the connection 130 fails, the method may involve passing 508 control of the antivirus scan to the internal antivirus server 112. When control of the antivirus scan is passed to the internal antivirus server 112, the method may involve recording 510 antivirus metadata 406b generated by the internal antivirus server 112 that describes the antivirus scan in the antivirus metadata repository 402 on the storage device 110.

The method may also involve determining 512 whether the connection 130 has been reestablished. If the connection 130 has not been reestablished, the connection 130 may continue to be monitored while antivirus metadata 406b generated by the internal antivirus server 112 continues to be collected. If the connection 130 has been restored, the method may involve returning 514 control of the antivirus scan to the external antivirus server 104.

While the above embodiments discuss the specific situation of a failure in the connection 130 occurring, control may be passed in response to other events as well. In certain embodiments, the monitor module 206 monitors for one or more transfer events for the external antivirus server 104 and the internal antivirus server 112. As used herein, a "transfer event" is an event that causes control of the antivirus scan to pass from the external antivirus server 104 to the internal antivirus server 112. In one embodiment, the transfer event is a failure in the connection 130. In other embodiments, the transfer event may be a determination that the bandwidth of the connection 130 has surpassed a threshold. The transfer event may be a user-generated message indicating that the user wishes to transfer control from the external antivirus server 104 to the internal antivirus server 112. In another embodiment, the transfer event may be a determination that the file being scanned is currently requested, and that the internal antivirus server 112 can execute the antivirus scan more quickly. The system may assume that the internal antivirus server 112 can execute the antivirus scan more quickly.

In certain embodiments, the transfer event may specify one or more files affected by the transfer event. For example, the transfer event cause control to be passed for only certain files; thus, the internal antivirus server 112 may execute the antivirus scan as to certain files, while the external antivirus server 104 executes the antivirus scan as to other files. In such an embodiment, the respective metadata modules 204a and 204b may both cause antivirus metadata to be written to the antivirus metadata repository 214.

The failback module 212 may be configured to return control of the antivirus scan to the external antivirus server 104 in response to detecting a failback event. As used herein, a "failback event" is an event that causes control of the antivirus scan to pass from the internal antivirus server 112 back to the external antivirus server 104. For example, the failback event may be a determination that the connection 130 has been restored. The failback event may be a determination the bandwidth of the connection 130 has fallen below a threshold. The failback event may be a user-generated message indicating that the user wishes to transfer control of the antivirus scan back to the external antivirus server 104.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a non-transitory computer-readable storage medium, the computer program product comprising instructions for:

monitoring a connection between an external antivirus server and a storage device, wherein the external antivirus server sends one or more heartbeats to the storage device;

monitoring for one or more transfer events for the external antivirus server and the storage device, the external antivirus server executing an antivirus scan on the storage device;

recording antivirus metadata that describes the antivirus scan in an antivirus metadata repository stored on the storage device;

passing control of the antivirus scan to an internal antivirus server in response to detecting a transfer event, the transfer event comprising one of bandwidth of a connection between the external antivirus server and the internal antivirus server surpassing a threshold and a failure in the connection; and returning control of the antivirus scan to the external antivirus server in response to a failback event.

2. The computer program product of claim 1, wherein passing control of the antivirus scan to the internal antivirus server comprises: determining a progress marker of the antivirus scan from the antivirus metadata; and continuing the antivirus scan from a point determined from the progress marker.

3. The computer program product of claim 1, wherein the internal antivirus server sends antivirus metadata that is written to the antivirus metadata repository while the internal antivirus server has control of the antivirus scan.

4. The computer program product of claim 1, wherein the external antivirus server sends antivirus metadata that is written to the antivirus metadata repository while the external antivirus server has control of the antivirus scan.

5. The computer program product of claim 1, wherein the storage device is a network attached storage (NAS) device.

6. The computer program product of claim 1, wherein the external antivirus server executes a first version of antivirus software, and wherein the internal antivirus server executes a second version of antivirus software.

7. The computer program product of claim 6, wherein the first version is a test version of the antivirus software, and wherein the second version is a production version of the antivirus software.

8. A system comprising:
an external antivirus server that is connected to a first storage device and that is physically separate from the first storage device, wherein the external antivirus server sends one or more heartbeats to the storage device, the external antivirus server configured to execute an antivirus scan on the first storage device;
an internal antivirus server that executes on the first storage device, the internal antivirus server configured to execute the antivirus scan on the first storage device; and
an antivirus central control module that executes on the first storage device, the antivirus central control module comprising instructions for:
monitoring the connection between the external antivirus server and the first storage device;
recording antivirus metadata that describes the antivirus scan in an antivirus metadata repository stored on the first storage device;
passing control of the antivirus scan to the internal antivirus server in response to detecting a transfer event, the transfer event comprising one of bandwidth of the connection surpassing a threshold and a failure in the connection;
returning control of the antivirus scan to the external antivirus server in response to restoration of the connection.

9. The system of claim 8, further comprising a computing device on which the external antivirus server executes, the computing device connected to the first storage device by a network connection.

10. The system of claim 8, further comprising a plurality of second storage devices, wherein the external antivirus server is connected to the plurality of second storage devices and configured to execute antivirus scans on the plurality of second storage devices.

11. The system of claim 10, wherein each of the plurality of second storage devices executes a second internal antivirus server and a second antivirus central control module.

12. The system of claim 8, wherein the connection is a network connection established on one of: an Ethernet connection; a Fibre Channel connection; and an Infiniband connection.

13. A computer-implemented method comprising:
monitoring a connection between an external antivirus server and a storage device, the external antivirus server executing an antivirus scan on the storage device, wherein the external antivirus server sends one or more heartbeats to the storage device;
recording antivirus metadata that describes the antivirus scan in an antivirus metadata repository stored on the storage device;
passing control of the antivirus scan to an internal antivirus server in response to detecting a transfer event, the transfer event comprising one of bandwidth of the connection surpassing a threshold and a failure in the connection; and
returning control of the antivirus scan to the external antivirus server in response to restoration of the connection.

14. The method of claim 13, wherein passing control of the antivirus scan to the internal antivirus server comprises: determining a progress marker of the antivirus scan from the antivirus metadata; and continuing the antivirus scan from a point determined from the progress marker.

15. The method of claim 13, wherein monitoring the connection between the external antivirus server and the storage device further comprises the external antivirus server sending one or more heartbeats to the storage device.

16. The method of claim 13, wherein the internal antivirus server sends antivirus metadata that is written to the antivirus metadata repository while the internal antivirus server has control of the antivirus scan.

17. The method of claim 13, wherein the external antivirus server sends antivirus metadata that is written to the antivirus metadata repository while the external antivirus server has control of the antivirus scan.

18. The method of claim 13, wherein the external antivirus server executes a test version of antivirus software, and wherein the internal antivirus server executes a production version of antivirus software.

19. A computer program product stored on a non-transitory computer-readable storage medium, the computer program product comprising instructions for:
monitoring a connection between an external antivirus server and a storage device, the external antivirus server executing an antivirus scan on the storage device, wherein monitoring the connection comprises:
sending one or more heartbeats to the storage device;
determining that there is a failure in the connection in response to failing to receive one or more heartbeats within a predetermined timeout period;
determining that the connection is restored in response to receiving one or more heartbeats after the failure in the connection;
recording antivirus metadata that describes the antivirus scan in an antivirus metadata repository stored on the storage device;
passing control of the antivirus scan to an internal antivirus server in response to detecting a transfer event, the transfer event comprising one of bandwidth of a connection between the external antivirus server and the internal antivirus server surpassing a threshold and a failure in the connection; and
returning control of the antivirus scan to the external antivirus server in response to restoration of the connection.

* * * * *